United States Patent
Yamashita et al.

(10) Patent No.: US 10,821,531 B2
(45) Date of Patent: Nov. 3, 2020

(54) HARD TIP BAND-SAW BLADE

(71) Applicants: AMADA HOLDINGS CO., LTD., Kanagawa (JP); AMADA MACHINE TOOLS COMPANY, LTD., Kanagawa (JP)

(72) Inventors: Yoshihiro Yamashita, Kanagawa (JP); Manfred Schloegl, Kanagawa (JP); Kensaku Maeda, Kanagawa (JP)

(73) Assignees: AMADA HOLDINGS CO., LTD., Kanagawa (JP); AMADA MACHINE TOOLS COMPANY, LTD., Kanagawa (JP)

( * ) Notice: Subject to any disclaimer, the term of this patent is extended or adjusted under 35 U.S.C. 154(b) by 0 days.

(21) Appl. No.: 16/482,849

(22) PCT Filed: Feb. 21, 2018

(86) PCT No.: PCT/JP2018/006164
§ 371 (c)(1),
(2) Date: Aug. 1, 2019

(87) PCT Pub. No.: WO2018/155479
PCT Pub. Date: Aug. 30, 2018

(65) Prior Publication Data
US 2020/0009669 A1 Jan. 9, 2020

(30) Foreign Application Priority Data
Feb. 24, 2017 (JP) .................................. 2017-033754

(51) Int. Cl.
*B23D 61/12* (2006.01)

(52) U.S. Cl.
CPC ......... *B23D 61/121* (2013.01); *B23D 61/127* (2013.01)

(58) Field of Classification Search
CPC ..... B23D 61/121; B23D 61/127; B23D 61/14
(Continued)

(56) References Cited

U.S. PATENT DOCUMENTS 3,576,200 A * 4/1971 Elmes .................. B23D 61/021
83/848
4,784,033 A * 11/1988 Hayden ................ B23K 31/025
83/661

(Continued)

FOREIGN PATENT DOCUMENTS

| CA | 2113047 A1 * | 7/1994 | ............. B23D 63/00 |
| JP | 2000263327 A * | 9/2000 | ............. B27B 33/06 |

(Continued)

OTHER PUBLICATIONS

Official Communication issued in International Bureau of WIPO Patent Application No. PCT/JP2018/006164, dated Apr. 17, 2018.
(Continued)

*Primary Examiner* — Ghassem Alie
*Assistant Examiner* — Bharat C Patel
(74) *Attorney, Agent, or Firm* — Greenblum & Bernstein, P.L.C.

(57) ABSTRACT

A hard tip band-saw blade includes alternating sawtooth groups. Each of the sawtooth groups includes two sawtooth subgroups. The first sawtooth subgroup includes, as a plurality of sawteeth, a first leading tooth and a first following tooth and the second sawtooth subgroup includes, as a plurality of sawteeth, a second leading tooth, a second following tooth, and a third following tooth. Each tooth top corner part of a hard tip of the first following tooth, a tooth top corner part on a left side of a hard tip of the second following tooth, and a tooth top corner part on a right side of a hard tip of the third following tooth most outwardly protrude in a left-right direction.

10 Claims, 11 Drawing Sheets

(58) Field of Classification Search
USPC ........ 83/835–855, 660, 698.61, 825; 30/329, 30/392; 76/50.2, 101
See application file for complete search history.

(56) References Cited

U.S. PATENT DOCUMENTS

| | | | | |
|---|---|---|---|---|
| 4,827,822 A * | 5/1989 | Yoshida | ................ | B23D 61/121 83/835 |
| 5,477,763 A * | 12/1995 | Kullman | ................ | B23D 61/021 83/846 |
| 5,832,803 A * | 11/1998 | Hayden, Sr. | ................ | B23D 61/121 83/661 |
| 6,158,324 A * | 12/2000 | Kullmann | ................ | B23D 61/021 408/206 |
| 6,220,139 B1 * | 4/2001 | Kobayashi | ................ | B23D 61/121 83/835 |
| 6,276,249 B1 * | 8/2001 | Handschuh | ................ | B23D 61/121 83/846 |
| 6,520,722 B2 * | 2/2003 | Hopper | ................ | B23D 61/021 407/42 |
| 7,036,417 B2 * | 5/2006 | Alton | ................ | B23D 61/121 83/846 |
| 7,131,365 B2 * | 11/2006 | Hall | ................ | B23D 61/121 83/846 |
| 7,210,388 B2 * | 5/2007 | Pacher | ................ | B23D 61/127 30/345 |
| 7,661,347 B2 * | 2/2010 | Nagano | ................ | B23D 61/121 83/835 |
| RE43,287 E * | 4/2012 | Hall | ................ | 83/846 |
| 8,695,470 B2 * | 4/2014 | Kullmann | ................ | B23D 61/021 83/661 |
| 9,038,512 B2 * | 5/2015 | Horiguchi | ................ | B23D 61/121 83/13 |
| 9,821,391 B2 * | 11/2017 | Tsujimoto | ................ | B23D 61/121 |
| 10,363,620 B2 * | 7/2019 | Kullmann | ................ | B23D 61/121 |
| 10,537,951 B2 * | 1/2020 | Hunter | ................ | B23D 61/123 |
| 2004/0255749 A1 * | 12/2004 | Hayden, Sr. | ................ | B23D 61/121 83/788 |
| 2005/0028664 A1 * | 2/2005 | Terada | ................ | B23D 61/021 83/835 |
| 2005/0257660 A1 * | 11/2005 | Hayden | ................ | B23D 61/121 83/846 |
| 2011/0154970 A1 * | 6/2011 | Oshibe | ................ | B23D 61/121 83/835 |
| 2012/0055313 A1 * | 3/2012 | Nagano | ................ | B23D 61/121 83/835 |
| 2012/0279372 A1 * | 11/2012 | Kullmann | ................ | B23D 61/121 83/846 |
| 2015/0190871 A1 * | 7/2015 | Dexter | ................ | B23D 61/121 83/851 |
| 2016/0008899 A1 * | 1/2016 | Hunter | ................ | B23D 61/121 83/849 |
| 2017/0056989 A1 * | 3/2017 | Vogel | ................ | B23D 61/121 |
| 2017/0297124 A1 * | 10/2017 | Rakurty | ................ | B23D 61/14 |
| 2017/0355030 A1 * | 12/2017 | Fowler | ................ | B23D 61/18 |
| 2018/0099341 A1 * | 4/2018 | Rakurty | ................ | B23D 61/121 |
| 2018/0369941 A1 * | 12/2018 | Nagano | ................ | B23D 61/121 |

FOREIGN PATENT DOCUMENTS

| | | | |
|---|---|---|---|
| JP | 3370166 B2 * | 1/2003 | ............ B23D 61/00 |
| JP | 2005-059124 | 3/2005 | |
| JP | 2014-176956 | 9/2014 | |

OTHER PUBLICATIONS

Decision to Grant issued in Japan Counterpart Patent Appl. No. 2017-033754, dated Apr. 4, 2018 along with an English language translation thereof.

* cited by examiner

FIG. 1
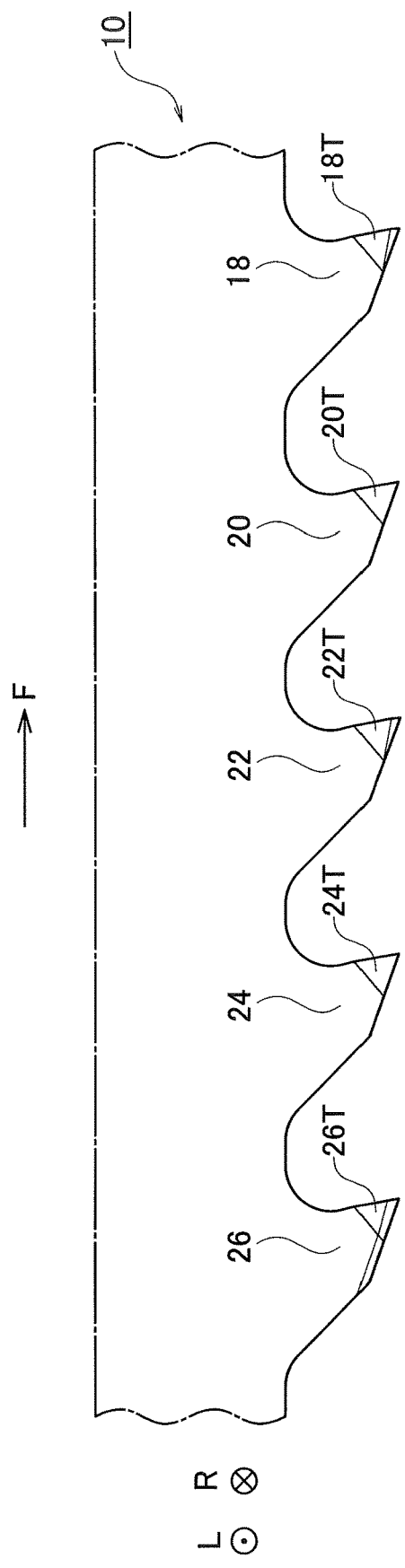
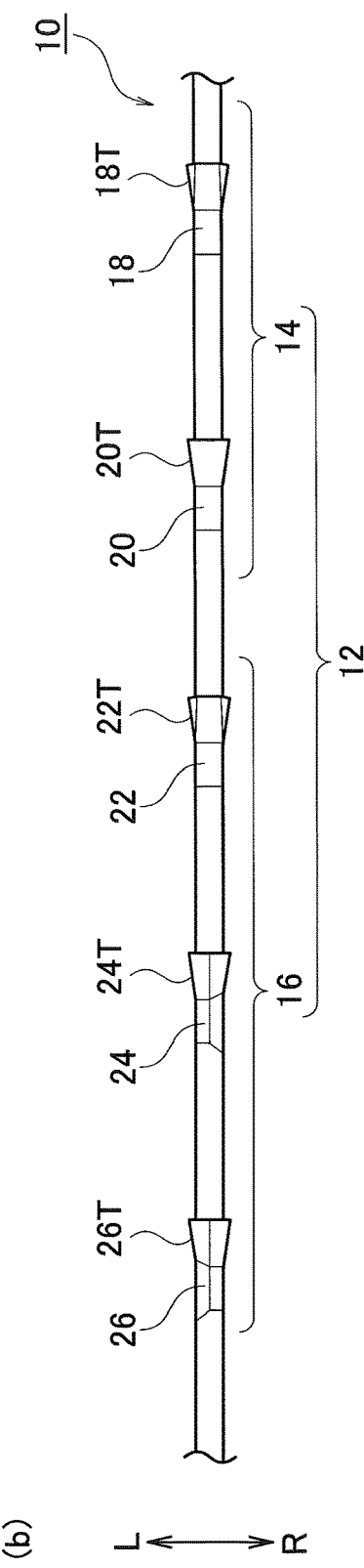

FIG. 4
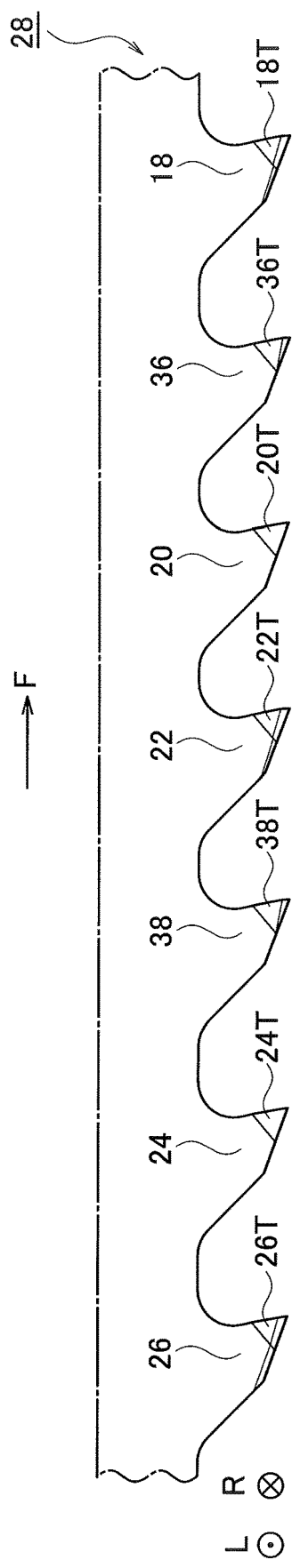
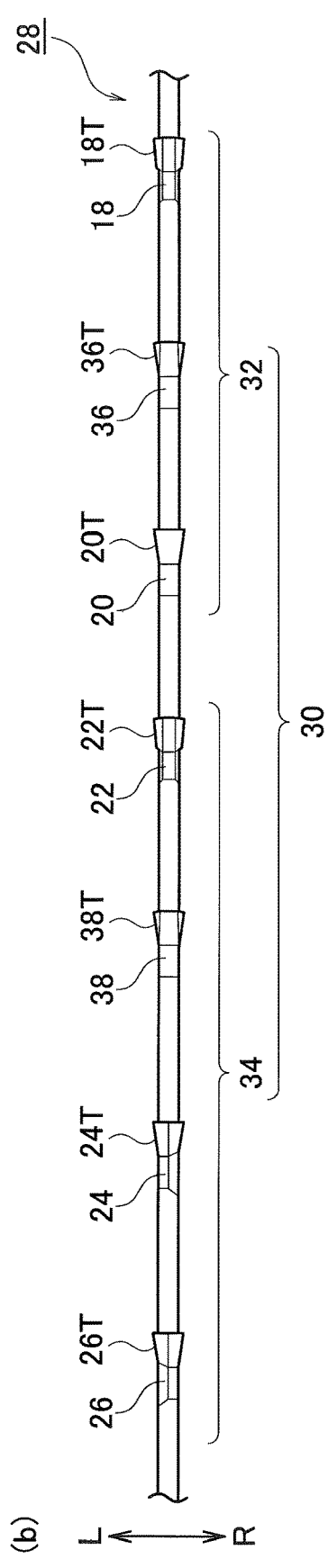

HARD TIP BAND-SAW BLADE

TECHNICAL FIELD

The present invention relates to a hard tip band-saw blade used when a band saw carries out a sawing process (cutting process) on a workpiece (metal work) and having a hard tip made of hard material on the tooth top side of each sawtooth.

BACKGROUND ART

In recent years, hard tip band-saw blades of excellent cutting ability are more widely used than bimetal band-saw blades having a body made of strengthened alloy steel and a cutting part made of high-speed tool steel.

The hard tip band-saw blade has, on the tooth top side of each sawtooth (cutting tooth), a hard tip made of hard material such as cemented carbide.

Typical hard tip band-saw blades that can be mentioned are the following two type of hard tip band-saw blades.

A first prior-art hard tip band-saw blade includes alternating sawtooth groups each being a combination of a plurality of sawteeth. The plurality of sawteeth in each sawtooth group include a leading tooth and a following tooth.

The leading tooth is formed in a left-right symmetrical shape. At a tooth top corner part on each of the left and right sides of a hard tip of the leading tooth, a chamfer (corner chamfer) is formed. Namely, the leading tooth is a bevel tooth that is one of left-right symmetrical sawteeth.

The following tooth is arranged to follow the leading tooth. The tooth height size thereof is set to be smaller than the tooth height size of the leading tooth. The following tooth is formed in a left-right symmetrical shape that widens toward a tooth top edge (tooth top ridge line) side like a plectrum (trapezoid or dovetail (dove tail shape)).

In other words, the following tooth is a plectrum tooth (trapezoidal tooth or dovetailed tooth (dove tail shaped tooth)) that is one of the left-right symmetrical sawteeth (refer to Comparison Example 1 to be explained later).

Here, in the first hard tip band-saw blade, each tooth top corner part of the hard tip of the following tooth most outwardly protrudes in a left-right direction. Namely, in each sawtooth group, the following tooth is a finishing tooth to finish a cut face of a workpiece.

The second prior-art hard tip band-saw blade includes alternating sawtooth groups each being a combination of a plurality of sawteeth.

The plurality of sawteeth in each sawtooth group include a leading tooth, a first following tooth, and a second following tooth.

The leading tooth is formed in a left-right symmetrical shape. At a tooth top corner part on each of the left and right sides of a hard tip of the leading tooth, a chamfer is formed. In other words, the leading tooth is a bevel tooth that is one of the left-right symmetrical sawteeth.

The first following tooth is arranged to follow the leading tooth. The tooth height size thereof is set to be smaller than the tooth height size of the leading tooth. The first following tooth is formed like a plectrum (trapezoid or dovetail (dove tail shape)) that widens toward a tooth top edge side. At a tooth top corner part on a left/right first side of a hard tip thereof, a chamfer is formed.

In other words, the first following tooth is a one-side plectrum tooth (set tooth or one-side dovetailed tooth) that is one of left-right asymmetrical sawteeth.

The second following tooth is arranged to follow the first following tooth. The tooth height size thereof is set to be the same as the tooth height size of the first following tooth. The second following tooth is formed like a plectrum (trapezoid or dovetail) that widens toward a tooth top edge side. At a tooth top corner part on a left/right second side of a hart tip thereof, a chamfer is formed.

In other words, the second following tooth is a one-side plectrum tooth (set tooth or one-side dovetailed tooth) that is one of the left-right asymmetrical sawteeth (refer to Comparison Example 2 to be explained later).

Here, in the second hard tip band-saw blade, a tooth top corner part on a left/right second side of the hard tip of the first following tooth and a tooth top corner part on a left/right first side of the hard tip of the second following tooth most outwardly protrude in the left-right direction. Namely, in each sawtooth group, the first following tooth and second following tooth are finishing teeth to finish a cut face of a workpiece.

In addition, related arts concerning the hard tip band-saw blades are shown in Patent Literatures 1 to 3.

PRIOR ART DOCUMENT

Patent Literature

Patent Literature 1: Japanese Patent Publication No. 3370166

Patent Literature 2: Japanese Unexamined Patent Application Publication No. 2000-263327

Patent Literature 3: Japanese Unexamined Patent Application Publication No. 2014-176956

SUMMARY OF THE INVENTION

By the way, in the first prior-art hard tip band-saw blade that is conducting a cutting process of a workpiece of hard metal such as steel, the hard tip of the following tooth is in a state of being restricted in the left-right direction by a cut groove of the workpiece.

Due to this, if the following tooth that is a left-right symmetrical plectrum tooth involves accuracy (left-right symmetry) variations due to manufacturing errors, cutting resistance in the left-right direction will vary to easily cause a crooked cut in the workpiece or a tooth chipping of the hard tip band-saw blade. This causes a problem that it is hard to improve a cut face accuracy of the workpiece or a service life of the hard tip band-saw blade.

Here, the crooked cut in a workpiece is a phenomenon caused by a bend of the hard tip band-saw blade depending on material of the workpiece or the worn state, feed rate, cutting rate, and the like of the hard tip band-saw blade, to make a cut face of the workpiece spherical or slanted. The crooked cut of a workpiece results in providing an unacceptable product due to an inferior cut face accuracy of the workpiece or damaging the hard tip band-saw blade.

Further, according to the second prior-art hard tip band-saw blade, when the tooth top corner part on the left/right second side of the hard tip of the first following tooth and the tooth top corner part on the left/right first side of the hard tip of the second following tooth receive cutting resistance in the left-right direction, elastic deforming force is applied to the body and tooth bottom of the hard tip band-saw blade. This results in enlarging vibrations (variations) of the first following tooth or second following tooth in the left-right direction to lower a cut face accuracy of the workpiece or cause a body breakage of the hard tip band-saw blade.

A hard tip band-saw blade used when carrying out a cutting process on a workpiece that is mainly made of soft metal such as aluminum alloy (hereinafter referred to as a soft metal cutting hard tip band-saw blade, if necessary) has a reduced number of finishing teeth in each sawtooth group.

This is because the cutting ability of the soft metal cutting hard tip band-saw blade more depends on the hardness (softness) and material of a workpiece than the cutting amount (work amount) borne by a single sawtooth. Namely, the soft metal cutting hard tip band-saw blade is inappropriate to cut a workpiece made of hard metal such as steel.

The present invention has been made in consideration of the above-mentioned circumstances and an object thereof is to provide a hard tip band-saw blade having novel configuration capable of solving the above-mentioned problems.

According to a first aspect of the present invention, the hard tip band-saw blade used when carrying out a sawing process (cutting process) on a workpiece includes alternating sawtooth groups each being a combination of a plurality of sawteeth (cutting teeth) with each sawtooth being provided with a hard tip of hard material on a tooth top side of the sawtooth, wherein each sawtooth group is formed from two sawtooth subgroups, the first sawtooth subgroup has a plurality of sawteeth that include a first leading tooth (first bevel tooth) formed in a left-right symmetrical shape and having a chamfer (corner chamfer) at a tooth top corner part on each of left and right sides of the hard tip and a first following tooth (plectrum tooth or dovetailed tooth (dove tail shaped tooth)) arranged to follow the first leading tooth, set to be smaller than the first leading tooth in tooth height size, and formed in a left-right symmetrical shape that widens toward a tooth top edge (tooth top ridge line) side like a plectrum (trapezoid or dovetail (dove tail shape)), the second sawtooth subgroup has a plurality of sawteeth that include a second leading tooth (second bevel tooth) set to be the same as the first leading tooth in tooth height size, formed in a left-right symmetrical shape, and having a chamfer (corner chamfer) at a tooth top corner part on each of left and right sides of the hard tip, a second following tooth (one-side plectrum tooth or one-side dovetailed tooth) arranged to follow the second leading tooth, set to be the same as the first following tooth in tooth height size, formed to widen toward a tooth top edge side like a plectrum (trapezoid or dovetail (dove tail shape)), and having a chamfer (corner chamfer) at a tooth top corner part on a left/right first side of the hard tip, and a third following tooth (one-side plectrum tooth or one-side dovetailed tooth) arranged to follow the second following tooth, set to be the same as the first following tooth in tooth height size, formed to widen toward a tooth top edge side like a plectrum (trapezoid or dovetail (dove tail shape)), and having a corner chamfer at a tooth top corner part on a left/right second side of the hard tip, and each tooth top corner part of the hard tip of the first following tooth, the tooth top corner part on the left/right second side of the hard tip of the second following tooth, and the tooth top corner part on the left/right first side of the hard tip of the third following tooth most outwardly protrude in a left-right direction.

According to the first aspect of the present invention, the first sawtooth subgroup includes the first leading tooth and first following tooth of the above-mentioned configurations and corresponds to the sawtooth group of the first prior-art hard tip band-saw blade. The second sawtooth subgroup includes the second leading tooth, second following tooth, and third following tooth of the above-mentioned configurations and corresponds to the sawtooth group of the second prior-art hard tip band-saw blade. The hard tip of the first leading tooth, the hard tip of the first following tooth, and the hard tip of the second leading tooth each have a left-right symmetrical shape. These configurations heightens the ratio of the number of left-right symmetrical sawteeth to the total number of sawteeth in each sawtooth group, to improve straight movement of the hard tip band-saw blade.

When the tooth top corner part on the left/right second side of the second following tooth receives cutting resistance in the left-right direction, the third following tooth elastically deforms in a left/right first side direction, and when the tooth top corner part on the left/right first side of the hard tip of the third following tooth receives cutting resistance in the left/right direction, the second following tooth elastically deforms in a left/right second direction. With this, even if the first following tooth that is the left-right symmetrical plectrum tooth involves accuracy (left-right symmetry) variations due to manufacturing errors, the elastic deformations of the second following tooth and third following tooth in the left-right direction absorb the manufacturing errors, thereby maintaining straight movement of the hard tip band-saw blade.

According to a second aspect of the present invention, in addition to the configurations of the first aspect of the present invention, the first sawtooth subgroup includes a first middle tooth (first middle bevel tooth) arranged in the middle between the first leading tooth and the first following tooth, set to be smaller than the first leading tooth and larger than the first following tooth in tooth height size, formed in a left-right symmetrical shape, and having a chamfer at a tooth top corner part on each of left and right sides of the hard tip and the second sawtooth subgroup includes a second middle tooth (second middle bevel tooth) arranged in the middle between the second leading tooth and the second following tooth, set to be the same as the first middle tooth in tooth height size, formed in a left-right symmetrical shape, and having a chamfer at a tooth top corner part on each of left and right sides of the hard tip.

According to the second aspect of the present invention, the first middle tooth and second middle tooth each have a left-right symmetrical shape. This improves the ratio of the number of left-right symmetrical sawteeth to the total number of sawteeth in each sawtooth group, thereby improving straight motion of the hard tip band-saw blade.

In addition to the first leading tooth and second leading tooth, the first middle tooth and second middle tooth are bevel teeth, and therefore, a cutting amount (work amount) by the bevel teeth can be distributed among them in a cut groove depth direction of a workpiece.

BRIEF DESCRIPTION OF DRAWINGS

FIG. 1 is a diagram showing a hard tip band-saw blade according to a first embodiment, in which (a) shows a left side face of a part of the hard tip band-saw blade and (b) shows the part of the hard tip band-saw blade seen from a cutting edge side (tooth top side).

FIG. 4 is a diagram showing a hard tip band-saw blade according to a second embodiment, in which (a) shows a left side face of a part of the hard tip band-saw blade and (b) shows the part of the hard tip band-saw blade seen from a cutting edge side (tooth top side).

DESCRIPTION OF EMBODIMENTS

Figure 2:
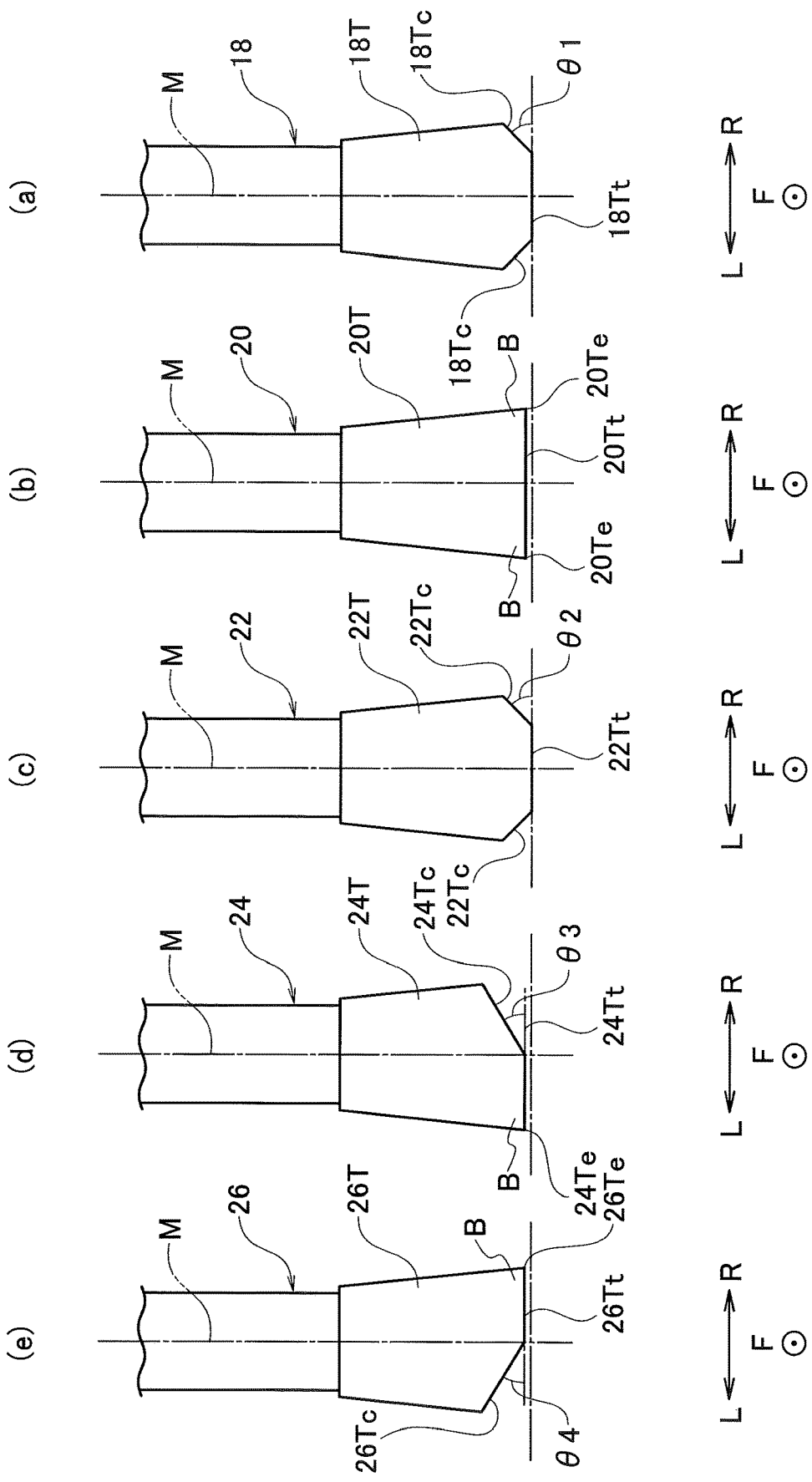
FIG. 2 is a diagram showing the hard tip band-saw blade according to the first embodiment, in which (a) is a diagram showing a first leading tooth of the hard tip band-saw blade seen from a saw blade forwarding direction, (b) is a diagram showing a first following tooth of the hard tip band-saw blade seen from the saw blade forwarding direction, (c) is a diagram showing a second leading tooth of the hard tip band-saw blade seen from the saw blade forwarding direction, (d) is a diagram showing a second following tooth of the hard tip band-saw blade seen from the saw blade forwarding direction, and (e) is a diagram showing a third following tooth of the hard tip band-saw blade seen from the saw blade forwarding direction.

Hereinafter, embodiments (first to third embodiments) of the present invention will be explained with reference to the drawings.

In the specification and claims of this application, the "left-right" direction is, in a state that the cutting edge (tooth top) of a hard tip band-saw blade is oriented downward, a left-right direction seen from a saw blade forwarding direction (a direction to move forward the hard tip band-saw blade). The "left/right first side" is any one of left and right sides. The "left/right second side" is an opposite side of the left/right first side. If the left/right first side is the right side, the left/right second side is the left side, and if the left/right first side is the left side, the left/right second side is the right side. The "leading" means ahead when seen from the saw blade forwarding direction and the "following" means hind when seen from the saw blade forwarding direction. The "saw blade center line" is a line passing through a left-right directional center of the hard tip band-saw blade.

The "tooth height size" is a dimension from a virtual reference line (not shown in the drawings) extending along a saw back in a body of the hard tip band-saw blade to a tooth top, where the larger the tooth height size, the longer the distance from the saw back to the tooth top and the smaller the tooth height size, the shorter the distance from the saw back to the saw top. In the drawings, "L" indicates the left direction, "R" the right direction, and "F" the saw blade forwarding direction.

First Embodiment

Figure 3:
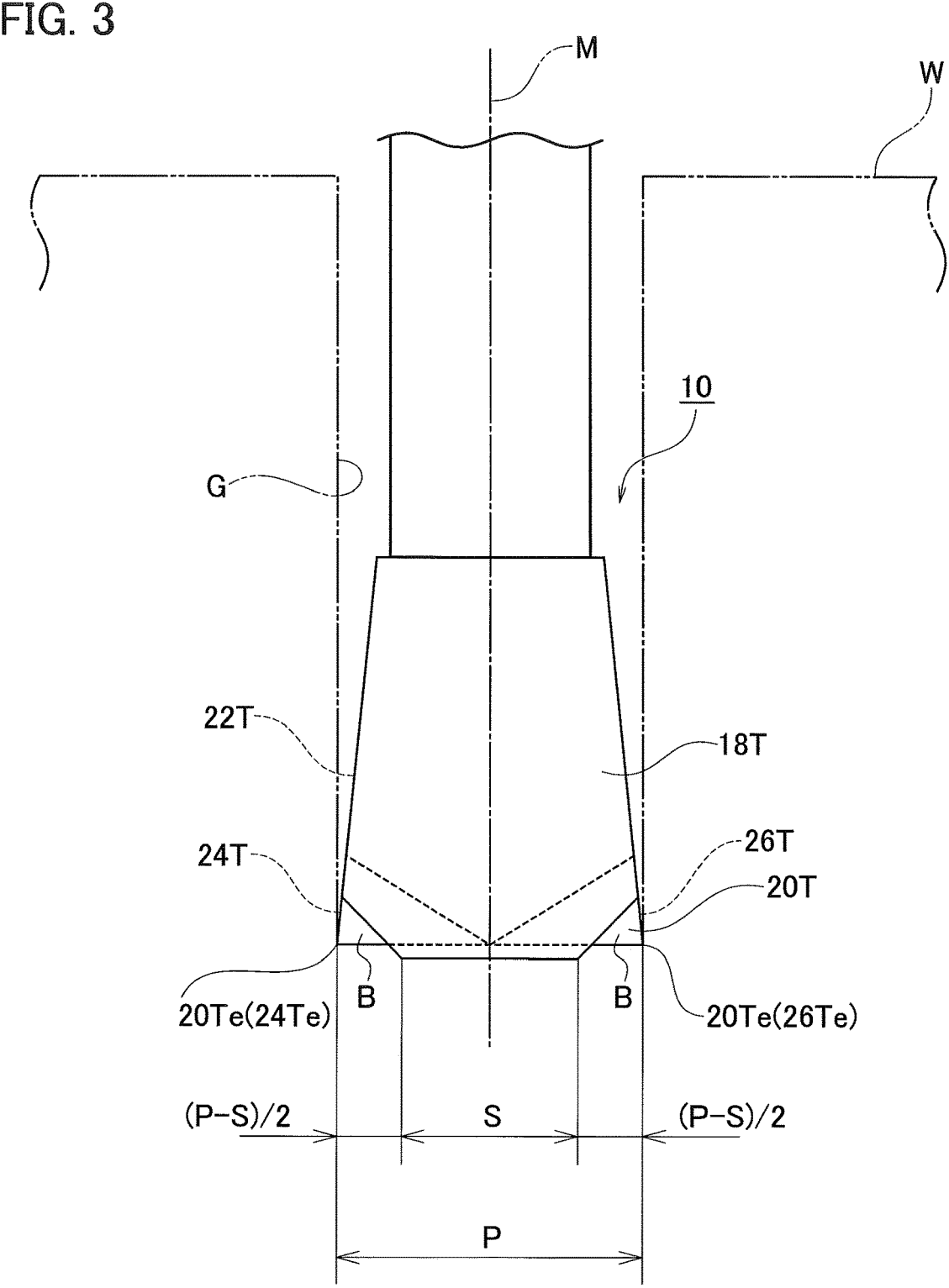
FIG. 3 is an enlarged diagram showing the first leading tooth and the like of the hard tip band-saw blade according to the first embodiment seen from the saw blade forwarding direction and a state of carrying out a cutting process on a workpiece.
Figure 5:
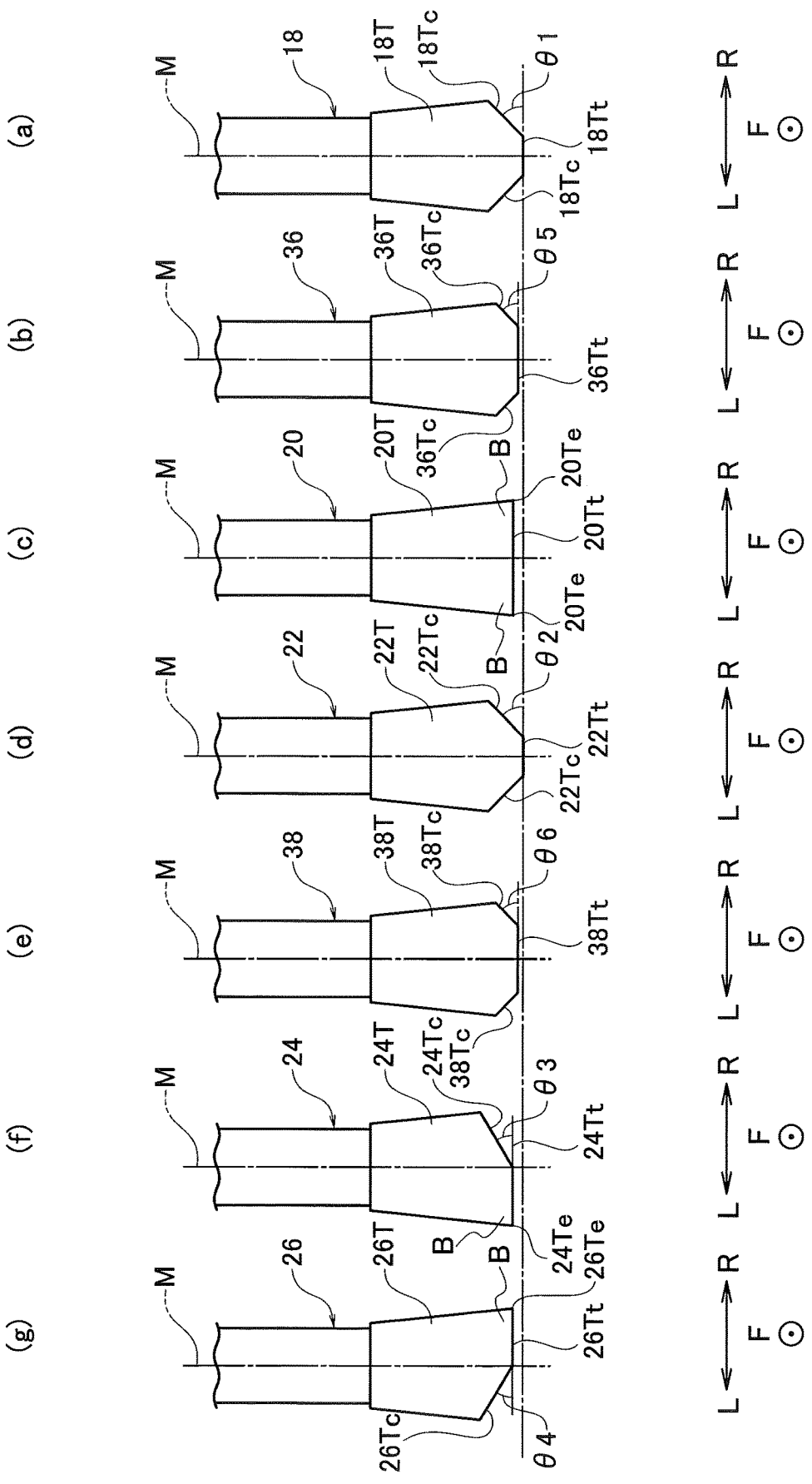
FIG. 5 is a diagram showing the hard tip band-saw blade according to the second embodiment, in which (a) is a diagram showing a first leading tooth of the hard tip band-saw blade seen from a saw blade forwarding direction, (b) is a diagram showing a first middle tooth of the hard tip band-saw blade seen from the saw blade forwarding direction, (c) is a diagram showing a first following tooth of the hard tip band-saw blade seen from the saw blade forwarding direction, (d) is a diagram showing a second leading tooth of the hard tip band-saw blade seen from the saw blade forwarding direction, (e) is a diagram showing a second middle tooth of the hard tip band-saw blade seen from the saw blade forwarding direction, (f) is a diagram showing a second following tooth of the hard tip band-saw blade seen from the saw blade forwarding direction, and (g) is a diagram showing a third following tooth of the hard tip band-saw blade seen from the saw blade forwarding direction.

As shown in FIG. 1(a)(b) to FIG. 3, a hard tip band-saw blade 10 according to the first embodiment is a cutting tool used when carrying out a sawing process (cutting process) by a band saw on a workpiece (metal work) made of hard metal such as steel.

The hard tip band-saw blade 10 is endlessly structured and a body (main body) of the hard tip band-saw blade 10 is made of alloy steel of high toughness.

The hard tip band-saw blade 10 has alternating sawtooth groups 12 each being a combination (sawtooth pattern) of a plurality of sawteeth (cutting teeth). Each of the sawtooth groups 12 includes two sawtooth subgroups 14 and 16 each being a combination of a plurality of sawteeth.

The first sawtooth subgroup 14 contains a plurality of sawteeth including a first leading tooth 18 and a first following tooth 20. The second sawtooth subgroup 16 contains a plurality of sawteeth including a second leading tooth 22, a second following tooth 24, and a third following tooth 26. In other words, each of the sawtooth groups 12 contains five sawteeth.

Here, the first leading tooth 18 has, on its tooth top side, a hard tip 18T made of cemented carbide (hard material called cemented carbide containing, for example, tungsten carbide or cobalt). Similarly, the first following tooth 20 has, on its tooth top side, a hard tip 20T made of cemented carbide, the second leading tooth 22 has, on its tooth top side, a hard tip 22T made of cemented carbide, and the second following tooth 24 has, on its tooth top side, a hard tip 24T made of cemented carbide.

The third following tooth 26 has, on its tooth top side, a hard tip 26T made of cemented carbide. The cemented carbide may additionally contain titanium carbide and the like. Instead of using the cemented carbide as a material for forming the hard tip 18T and the like, other hard material such as cermet containing tungsten carbide and the like may be used to form the hard tip 18T and the like.

Next, structures of the first leading tooth 18, first following tooth 20, second leading tooth 22, second following tooth 24, and third following tooth 26 will be explained in detail.

As shown in FIG. 1 to FIG. 3, the first leading tooth 18 is, as mentioned above, one of the sawteeth that form the first sawtooth subgroup 14 and is a sawtooth to form a cut groove G of a groove width S in the workpiece W. Further, the first leading tooth 18 (the hard tip 18T of the first leading tooth 18) is formed in a left-right symmetrical shape with respect to a saw blade center line M. At a tooth top corner part on each of left and right sides of the hard tip 18T of the first leading tooth 18, a chamfer (corner chamfer) 18Tc is formed.

In other words, the first leading tooth 18 is a first bevel tooth that is one of left-right symmetrical sawteeth. A chamfer angle θ1 of the chamfer 18Tc of the hard tip 18T of the first leading tooth 18 with respect to a tooth top edge (tooth top ridge line) 18Tt is set to, as an example, 40 to 50 degrees.

The first following tooth 20 is, as mentioned above, one of the sawteeth that constitute the first sawtooth subgroup 14 and is arranged to follow the first leading tooth 18. The first following tooth 20 is a sawtooth to expand the cutting groove G of the workpiece W to a groove width P. The tooth height size of the first following tooth 20 is set to be smaller than the tooth height size of the first leading tooth 18.

Further, the first following tooth 20 (the hard tip 20T of the first following tooth 20) is formed like a plectrum (trapezoid or dovetail (dove tail shape)) enlarging toward a tooth top edge 20Tt and is formed in a left-right symmetrical shape with respect to the saw blade center line M.

In other words, the first following tooth 20 is a plectrum tooth or a dovetailed tooth (dove tail shaped tooth) that is one of the left-right symmetrical sawteeth. Each tooth top corner part of the hard tip 20T of the first following tooth 20 is a protruding part (protruding edge part) B that outwardly protrudes in the left-right direction with respect to the chamfer 18Tc of the hard tip 18T of the first leading tooth 18.

The second leading tooth 22 is, as mentioned above, one of the sawteeth that constitute the second sawtooth subgroup 16 and is a sawtooth to form the cut groove G of the groove width S in the workpiece W. The tooth height size of the second leading tooth 22 is set to be the same as the tooth height size of the first leading tooth 18. Further, the second leading tooth 22 (the hard tip 22T of the second leading tooth 22) is formed in a left-right symmetrical shape with respect to the saw blade center line M.

At a tooth top corner part on each of the left and right sides of the hard tip 22T of the second leading tooth 22, a chamfer (corner chamfer) 22Tc is formed. In other words, the second leading tooth 22 is a second bevel tooth that is one of the left-right symmetrical sawteeth. A chamfer angle θ2 of the chamfer 22Tc of the hard tip 22T of the second leading tooth 22 with respect to a tooth top edge 22Tt is set to be equal to the chamfer angle θ1 of the chamfer 18Tc of the hard tip 18T of the first leading tooth 18 with respect to the tooth top edge (tooth top ridge line) 18Tt. In other words, the hard tip 22T of the second leading tooth 22 is formed in the same shape as the hard tip 18T of the first leading tooth 18.

The second following tooth 24 is, as mentioned above, one of the sawteeth that constitute the second sawtooth subgroup 16 and is arranged to follow the second leading tooth 22. The second following tooth 24 is a sawtooth that cooperates with the third following tooth 26 to expand the cut groove G to the groove width P. The tooth height size of the second following tooth 24 is set to be the same as the tooth height size of the first following tooth 20.

Further, the second following tooth 24 (the hard tip 24T of the second following tooth 24) is formed like a plectrum that widens toward a tooth top edge 24Tt. At a tooth top corner part on the right side of the hard tip 24T of the second following tooth 24, a chamfer (corner chamfer) 24Tc is formed. In other words, the second following tooth 24 is a one-side plectrum tooth (set tooth or one-side dovetailed tooth) that is one of left-right asymmetrical sawteeth.

A chamfer angle θ3 of the chamfer 24Tc of the second following tooth 24 with respect to the tooth top edge 24Tt is set to be smaller than the chamfer angle θ2 of the second leading tooth 22 and is set to, as an example, 20 to 40 degrees. Further, a tooth top corner part on the left side of the hard tip 24T of the second following tooth 24 is a protruding part B that outwardly protrudes in the left-right direction with respect to the chamfer 22Tc of the hard tip 22T of the second leading tooth 22.

The third following tooth 26 is, as mentioned above, one of the sawteeth that constitute the second sawtooth subgroup 16 and is arranged to follow the second following tooth 24. The third following tooth 26 is a sawtooth that cooperates with the second following tooth 24 to expand the cut groove G of the workpiece W to the groove width P. The tooth height size of the third following tooth 26 is set to be the same as the tooth height size of the first following tooth 20. Further, the third following tooth 26 (the hard tip 26T of the third following tooth 26) is formed like a plectrum that widens toward a tooth top edge 26Tt. At a tooth top corner part on the left side of the hard tip 26T of the third following tooth 26, a chamfer (corner chamfer) 26Tc is formed. In other words, the third following tooth 26 is a one-side plectrum tooth (set tooth or one-side dovetailed tooth) that is one of the left-right asymmetrical sawteeth.

A chamfer angle θ4 of the chamfer 26Tc of the hard tip 26T of the third following tooth 26 with respect to the tooth top edge 26Tt is set to be the same as the chamfer angle θ3 of the chamfer 24Tc of the hard tip 24T of the second following tooth 24 with respect to the tooth top edge 24Tt. Further, a tooth top corner part on the right side of the hard tip 26T of the third following tooth 26 is a protruding part B that outwardly protrudes in the left-right direction with respect to the chamfer 22Tc of the hard tip 22T of the second leading tooth 22.

By the way, instead of forming the chamfer 24Tc at the tooth top corner part on the right side of the hard tip 24T of the second following tooth 24, a chamfer (not shown) may be formed at the tooth top corner part on the left side of the hard tip 24T of the second following tooth 24.

In this case, instead of forming the chamfer 26Tc at the tooth top corner part on the left side of the hard tip 26T of the third following tooth 26, a chamfer (not shown) is formed at the tooth top corner part on the right side of the hard tip 26T of the third following tooth 26.

Each tooth top corner part of the hard tip 20T of the first following tooth 20, the tooth top corner part on the left side of the hard tip 24T of the second following tooth 24, and the tooth top corner part on the right side of the hard tip 26T of the third following tooth 26 each most outwardly protrude in the left-right direction. In other words, outer ends 20Te in the left-right direction of the tooth top edge (tooth top ridge line) 20Tt of the hard tip 20T of the first following tooth 20, an outer end (left end) 24Te in the left-right direction of the tooth top edge 24Tt of the hard tip 24T of the second following tooth 24, and an outer end (right end) 26Te in the left-right direction of the tooth top edge 26Tt of the hard tip 26T of the third following tooth 26 each are positioned most outwardly in the left-right direction.

Namely, in each of the sawtooth groups 12, the first following tooth 20, second following tooth 24, and third following tooth 26 are finishing teeth to finish a cut face of the workpiece W.

The hard tips of the sawteeth that cut a center part (part corresponding to the groove width S) in a groove width direction of the cut groove G of the workpiece W are the hard tip 18T of the first leading tooth 18 and the hard tip 22T of the second leading tooth 22. The hard tips of the sawteeth that cut a left end part (part corresponding to a groove width of (P−S)/2 on the left side) in the groove width direction of the cut groove G of the workpiece W are the hard tip 20T of the first following tooth 20 and the hard tip 24T of the second following tooth 24. The hard tips of the sawteeth that cut a right end part (part corresponding to a groove width of (P−S)/2 on the right side) in the groove width direction of the cut groove G of the workpiece W are the hard tip 20T of the first following tooth 20 and the hard tip 26T of the third following tooth 26. In other words, with the cut groove G to be formed in the workpiece W being divided into three sections in the groove width direction, each of the sawtooth groups 12 includes the same number of and a plurality of (two) sawteeth to cut the respective groove width sections of the cut groove G of the workpiece W.

Next, operation and effect of the first embodiment will be explained.

When the band saw is driven, the hard tip band-saw blade 10 cyclically runs in the saw blade forwarding direction, and at the same time, the hard tip band-saw blade 10 moves in a cutting direction (a direction to approach the workpiece W). Then, in a cutting area of the workpiece W by the band saw, the first leading tooth 18 forms the cut groove G of the groove width S in the workpiece W and the first following tooth 20 widens the cut groove G of the workpiece W to the groove width P.

Also, in the cutting area of the workpiece W by the band saw, the second leading tooth 22 forms the cut groove G of the groove width S and the second following tooth 24 and third following tooth 26 widen the cut groove G of the workpiece W to the groove width P. The actions mentioned above are continuously carried out so that the first following tooth 20, second following tooth 24, and third following tooth 26 finish a cut face of the workpiece W. With this, the hard tip band-saw blade 10 is able to carry out a required sawing process (cutting process) on the workpiece W.

The first sawtooth subgroup 14 includes the first leading tooth 18 and first following tooth 20 of the above-mentioned configurations and corresponds to the sawtooth group of the first prior-art hard tip band-saw blade. The second sawtooth subgroup 16 includes the second leading tooth 22, second following tooth 24, and third following tooth 26 of the above-mentioned configurations and corresponds to the sawtooth group of the second prior-art hard tip band-saw blade. Among them, the first leading tooth 18, first following tooth 20, and second leading tooth 22 each are left-right symmetrical sawteeth. This heightens the ratio of the number of left-right symmetrical sawteeth to the total number of sawteeth in each sawtooth group 12.

When the tooth top corner part on the left side of the hard tip 24T of the second following tooth 24 receives left-right directional cutting resistance, the second following tooth 24 and the body (the body of the hard tip band-saw blade 10) elastically deforms in the right direction.

When the tooth top corner part on the right side of the hard tip 26T of the third following tooth 26 receives left-right directional cutting resistance, the third following tooth 26 and the body elastically deforms in the left direction. In other words, the second following tooth 24, third following tooth 26, and body elastically deform while keeping a balanced state in the left-right direction. With this, even if the first leading tooth 18, which is a left-right symmetrical plectrum tooth, involves accuracy (left-right symmetry) variations due to manufacturing errors, the left-right directional elastic deformations of the second following tooth 24, third following tooth 26, and body absorb the manufacturing errors, thereby keeping straight movement of the hard tip band-saw blade 10. In addition, it sufficiently prevents the tooth breakage of the second following tooth 24 and third following tooth 26.

With the cut groove G formed in the workpiece W being divided into three sections in the groove width direction, each of the sawtooth groups 12 has the same number of and a plurality of sawteeth to cut the respective sections in the groove width direction of the cut groove G in the workpiece W. This results in distributing cutting resistance acting on the sawteeth over the sawteeth in each sawtooth group 12 and equalizing work amount of the sawteeth in each sawtooth group 12.

In this way, according to the first embodiment, even if the first leading tooth 18, which is a left-right symmetrical plectrum tooth, involves accuracy variations due to manufacturing errors, it is possible to maintain straight movement of the hard tip band-saw blade 10. As a result, the first embodiment is able to sufficiently suppress a crooked cut or the like by the hard tip band-saw blade 10 and improve the cut face accuracy of a workpiece W and the service life of the hard tip band-saw blade 10. In particular, it is able to distribute cutting resistance among the sawteeth in each of the sawtooth groups 12 and substantially equalize work amount of the sawteeth in each sawtooth group 12, thereby further improving the service life of the hard tip band-saw blade 10.

Second Embodiment

Figure 6:
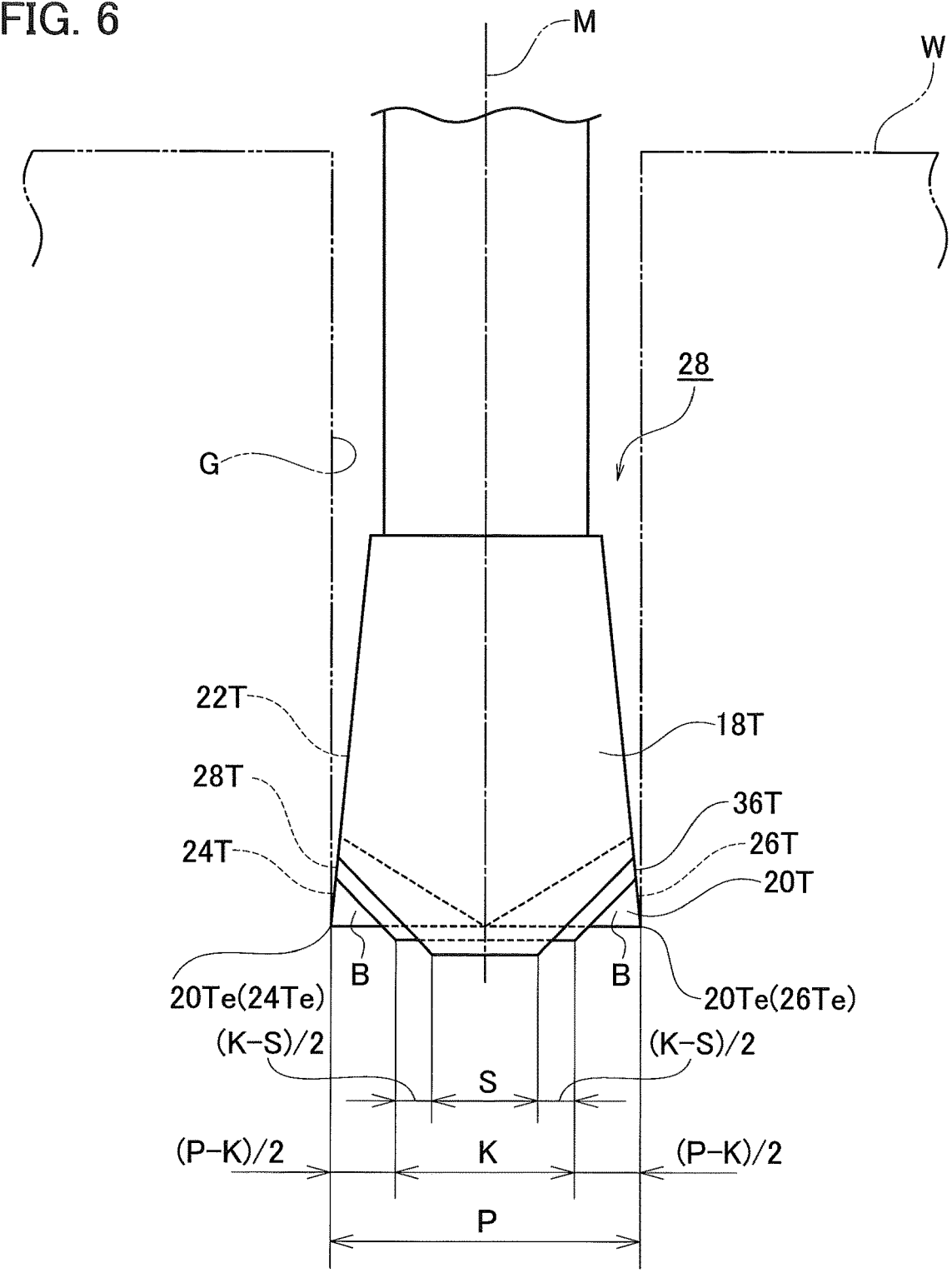
FIG. 6 is an enlarged diagram showing the first leading tooth and the like of the hard tip band-saw blade according to the second embodiment seen from the saw blade forwarding direction and a state of carrying out a cutting process on a workpiece.

As shown in FIG. 4 (a) (b) to FIG. 6, a hard tip band-saw blade 28 according to the second embodiment has a configuration similar to that of the hard tip band-saw blade 10 according to the first embodiment (refer to FIG. 1 (a) (b)). Hereunder, in the configuration of the hard tip band-saw blade 28, only part differing from the hard tip band-saw blade 10 will be explained. Among a plurality of structural elements of the hard tip band-saw blade 28, those corresponding to the structural elements of the hard tip band-saw blade 10 are represented with the same reference marks in the drawings.

The hard tip band-saw blade 28 has alternating sawtooth groups 30 each being a combination (sawtooth pattern) of a plurality of sawteeth (cutting teeth). Each of the sawtooth groups 30 includes two sawtooth subgroups 32 and 34 each being a combination of a plurality of sawteeth. The first sawtooth subgroup 32 includes as the plurality of sawteeth, unlike the first sawtooth subgroup 14 of the hard tip band-saw blade 10 (refer to FIG. 1(a),(b)), a first leading tooth 18 and a first following tooth 20, and in addition, a first middle tooth 36. The second sawtooth subgroup 34 includes as the plurality of sawteeth, unlike the second sawtooth subgroup 16 of the hard tip band-saw blade 10 (refer to FIG. 1(a)(b)), a second leading tooth 22, a second following tooth 24, and a third following tooth 26, and in addition, a second middle tooth 38. In other words, each of the sawtooth groups 30 includes seven sawteeth.

Here, the first middle tooth 36 has, on its tooth top side, a hard tip 36T made of cemented carbide (hard material called cemented carbide containing, for example, tungsten carbide or cobalt). The second middle tooth 38 has, on its tooth top side, a hard tip 38T made of cemented carbide. The cemented carbide may additionally contain titanium carbide or the like. Instead of employing the cemented carbide as a material to form the hard tip 36T and the like, other hard material such as cermet containing tungsten carbide or the like may be employed as a material to form the hard tip 36T and the like.

The first middle tooth 36 is, as mentioned above, one of the sawteeth that form the first sawtooth subgroup 32 and is arranged between the first leading tooth 18 and the first following tooth 20. The first middle tooth 36 is a sawtooth to widen a cut groove G in a workpiece W to a groove width K. The tooth height size of the first middle tooth 36 is set to be smaller than the tooth height size of the first leading tooth 18 and larger than the tooth height size of the first following tooth 20. Further, the first middle tooth 36 (the hard tip 36T of the first middle tooth 36) is formed in a left-right symmetrical shape with respect to a saw blade center line M. At a tooth top corner part on each of left and right sides of the hard tip 36T of the first middle tooth 36, a chamfer (corner chamfer) 36Tc is formed. In other words, the first middle tooth 36 is a first middle bevel tooth that is one of left-right symmetrical sawteeth. A chamfer angle θ5 of the chamfer 36Tc of the hard tip 36T of the first middle tooth 36 with respect to a tooth top edge (tooth top ridge line) 36Tt is set to be the same as that of the chamfer 18Tc of the hard tip 18T of the first leading tooth 18 with respect to the tooth top edge 18Tt.

The second middle tooth 38 is, as mentioned above, one of the sawteeth that form the second sawtooth subgroup 34 and is arranged between the second leading tooth 22 and the second following tooth 24. The second middle tooth 38 is a sawtooth to widen the cut groove G in the workpiece W to a groove width K. The tooth height size of the second middle tooth 38 is set to be the same as the tooth height size of the first middle tooth 36. Further, the second middle tooth 38 (the hard tip 38T of the second middle tooth 38) is formed in a left-right symmetrical shape with respect to the saw blade center line M. At a tooth top corner part on each of left and right sides of the hard tip 38T of the second middle tooth 38, a chamfer (corner chamfer) 38Tc is formed. In other words, the second middle tooth 38 is a second middle bevel tooth that is one of left-right symmetrical sawteeth. A chamfer angle θ6 of the chamfer 38Tc with respect to a tooth top edge 38Tt of the hard tip 38T of the second middle tooth 38 is set to be the same as that of the chamfer 36Tc with respect to the tooth top edge 36Tt of the hard tip 36T of the first middle tooth 36. In other words, the hard tip 38T of the second middle tooth 38 is formed in the same shape as the hard tip 36T of the first middle tooth 36.

Sawtooth hard tips to cut a center part (part corresponding to the groove width S) in a groove width direction of the cut groove G of the workpiece W are the hard tip 18T of the first leading tooth 18 and the hard tip 22T of the second leading tooth 22. Sawtooth hard tips to cut left and right sides (sections each corresponding to a groove width of (K−S)/2) of the center part in the groove width direction of the cut groove G of the workpiece W are the hard tip 36T of the first middle tooth 36 and the hard tip 38T of the second middle tooth 38. Sawtooth hard tips to cut a left end section (a section corresponding to a left groove width (P−K)/2) in the groove width direction of the cut groove G of the workpiece W are the hard tip 20T of the first following tooth 20 and the hard tip 24T of the second following tooth 24. Sawtooth hard tips to cut a right end section (a section corresponding to a right groove width of (P−K)/2) in the groove width direction of the cut groove G of the workpiece W are the hard tip 20T of the first following tooth 20 and the hard tip 26T of the third following tooth 26. In other words, with the cut groove G formed in the workpiece W being divided into the five sections in the groove width direction, the numbers of sawteeth to cut the respective sections in the groove width direction of the cut groove G of the workpiece W in each of the sawtooth groups 30 are equal to one another and each are plural (two).

Next, operation and effect of the second embodiment will be explained.

When the band saw is driven, the hard tip band-saw blade 28 cyclically runs in the saw blade forwarding direction, and at the same time, the hard tip band-saw blade 28 moves in a cutting direction (a direction to approach the workpiece W). Then, in a cutting area of the workpiece W by the band saw, the first leading tooth 18 forms the cut groove G of the groove width S in the workpiece W, the first middle tooth 36 widens the cut groove G of the workpiece W to the groove width K, and the first following tooth 20 widens the cut groove G of the workpiece W to the groove width P. Also, in the cutting area of the workpiece W by the band saw, the second leading tooth 22 forms the cut groove G of the groove width S in the workpiece W, the second middle tooth 38 widens the cut groove G of the workpiece W to the groove width K, and the second following tooth 24 and third following tooth 26 widen the cut groove G of the workpiece W to the groove width P. Thereafter, the actions mentioned above are continuously carried out so that the first following tooth 20, second following tooth 24, and third following tooth 26 finish a cut face of the workpiece W. With this, the hard tip band-saw blade 28 is able to carry out a required sawing process (cutting process) on the workpiece W.

The first sawtooth subgroup 32 includes the first leading tooth 18 and first following tooth 20 of the above-mentioned configurations and corresponds to the sawtooth group of the first prior-art hard tip band-saw blade. Further, the second sawtooth subgroup 34 includes the second leading tooth 22, second following tooth 24, and third following tooth 26 of the above-mentioned configurations and corresponds to the sawtooth group of the second prior-art hard tip band-saw blade. The first leading tooth 18, first middle tooth 36, first following tooth 20, second middle tooth 38, and second leading tooth 22 each are left-right symmetrical sawteeth. This increases the ratio of the number of left-right symmetrical sawteeth to the total number of sawteeth in each of the sawtooth groups 30, thereby improving straight movement of the hard tip band-saw blade 28.

Similar to the operation of the first embodiment, accuracy (left-right symmetry) variations due to manufacturing errors of the first following tooth 20 that is a left-right symmetrical plectrum tooth can be absorbed by left-right directional elastic deformations of the second following tooth 24 and third following tooth 26, to maintain straight movement of the hard tip band-saw blade 28. In addition, it sufficiently prevents tooth breakage of the second following tooth 24 and third following tooth 26.

With the cut groove G formed in the workpiece W being divided into five sections in the groove width direction, each of the sawtooth groups 30 has the same number of and a plurality of sawteeth to cut the respective sections in the groove width direction of the cut groove G of the workpiece W. This results in distributing cutting resistance acting on the sawteeth over the sawteeth in each sawtooth group 30 and equalizing work amount of the sawteeth in each sawtooth group 30.

In addition to the first leading tooth 18 and second leading tooth 22, the first middle tooth 36 and second middle tooth 38 each are bevel teeth so that cutting amount (work amount) in a depth direction of the cut groove G of the workpiece W can be distributed among the bevel teeth.

In this way, according to the second embodiment, even if the first leading tooth 18, which is a left-right symmetrical plectrum tooth, involves accuracy variations due to manufacturing errors, it is possible to sufficiently suppress a crooked cut by the hard tip band-saw blade 28 to further elongate the service life of the hard tip band-saw blade 28 and further improve a cut face accuracy of the workpiece. In particular, it is possible to distribute cutting resistance among the sawteeth in each sawtooth group 30, nearly equalize work amount of the sawteeth in each sawtooth group 30, and distribute cutting amount (work amount) in the depth direction of the cut groove G of the workpiece W among the respective bevel teeth, thereby further improving the service life of the hard tip band-saw blade 28.

Third Embodiment

Figure 7:
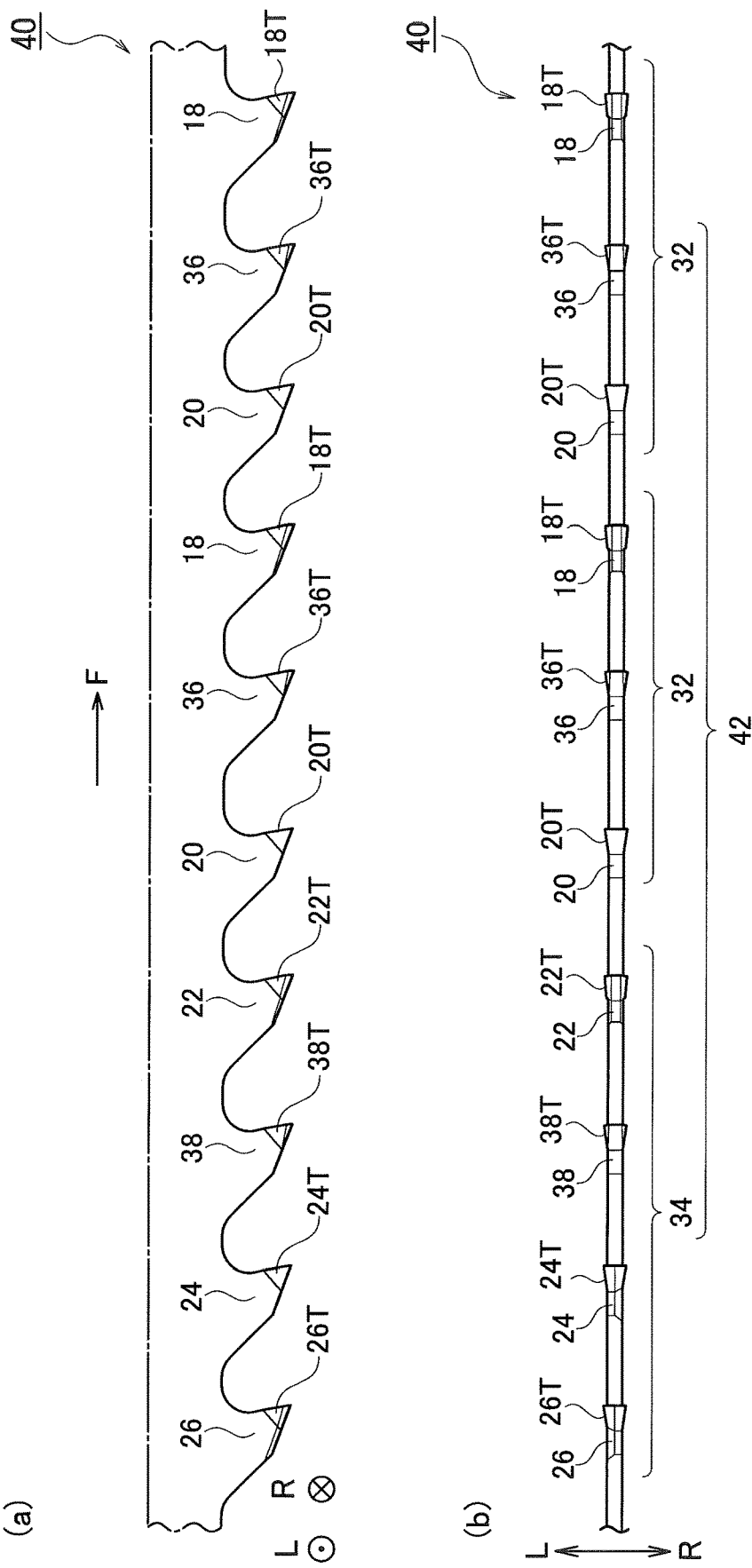
FIG. 7 is a diagram showing a hard tip band-saw blade according to a third embodiment, in which (a) shows a left side face of a part of the hard tip band-saw blade and (b) shows the part of the hard tip band-saw blade seen from a cutting edge side (tooth top side).

As shown in FIG. 7(a)(b), a hard tip band-saw blade 40 according to the third embodiment is configured similar to the hard tip band-saw blade 28 according to the second embodiment (refer to FIG. 4(a) (b)).

Hereunder, in the configuration of the hard tip band-saw blade 40, only part differing from the hard tip band-saw blade 28 will be explained.

Among a plurality of structural elements of the hard tip band-saw blade 40, those corresponding to the structural elements of the hard tip band-saw blade 28 are represented with the same reference marks in the drawings.

The hard tip band-saw blade 40 has alternating sawtooth groups 42 each being a combination (sawtooth pattern) of a plurality of sawteeth (cutting teeth). Each of the sawtooth groups 42 includes, unlike each of the sawtooth groups 30 of the hard tip band-saw blade 28 (refer to FIG. 4 (a) (b)), two first sawtooth subgroups 32 and one second sawtooth subgroup 34. In other words, each sawtooth group 42 is configured to have 10 sawteeth.

According to the third embodiment, operation and effect are similar to those of the second embodiment.

The present invention is not limited to the above-mentioned embodiments and is achievable in various forms through proper modifications. The scope of rights covered by the present invention is not limited to the above-mentioned embodiments.

Practical Examples

Practical examples (comparison examples 1 and 2, embodiment products 1 to 3, and comparison products 1 and 2) and a cutting test will be explained with reference to the drawings.

In the drawings, "L" indicates a left direction, "R" a right direction, and "F" a saw blade forwarding direction.

Comparison Example 1

Figure 8:
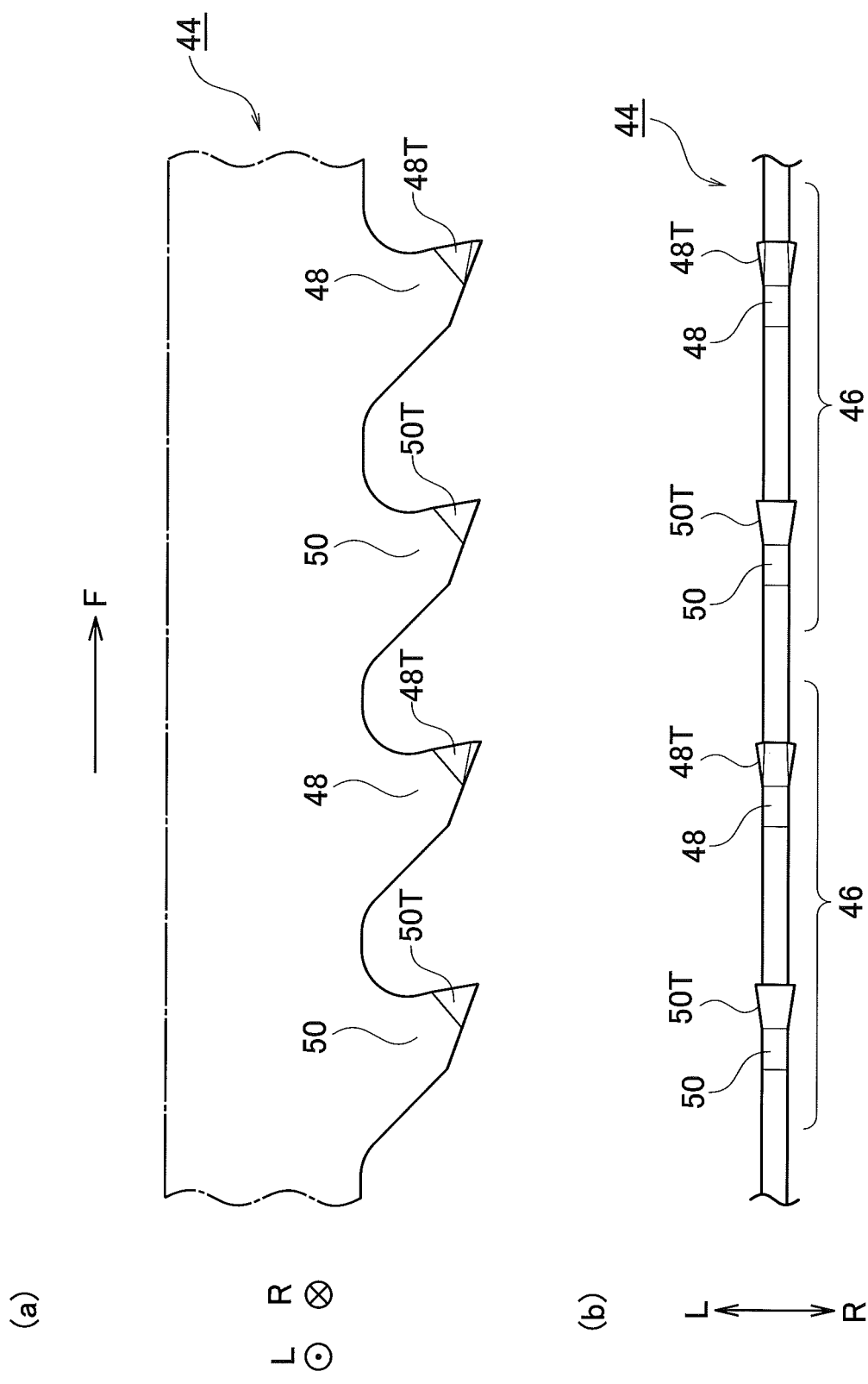
FIG. 8 is a diagram showing a hard tip band-saw blade according to a comparison example 1, in which (a) shows a left side face of a part of the hard tip band-saw blade and (b) shows the part of the hard tip band-saw blade seen from a cutting edge side (tooth top side).

As shown in FIG. 8(a)(b), a hard tip band-saw blade 44 of the comparison example 1 is a cutting tool corresponding to the first prior-arm hard tip band-saw blade and has alternating sawtooth groups 46 each being a combination of a plurality of sawteeth. Hereunder, the structure of the hard tip band-saw blade 44 will briefly be explained.

Each of the sawtooth groups 46 includes, as the plurality of sawteeth, a leading tooth 48 and a following tooth 50. In other words, each sawtooth group 46 is formed with two sawteeth. Here, the leading tooth 48 has, on its tooth top side, a hard tip 48T made of cemented carbide and is configured like the first leading tooth 18 in the first sawtooth subgroup 14 of the hard tip band-saw blade 10 (refer to FIG. 1(a) (b)). The following tooth 50 has, on its tooth top side, a hard tip 50T made of cemented carbide and is configured like the first following tooth 20 in the first sawtooth subgroup 14 of the hard tip band-saw blade 10 (refer to FIG. 1(a)(b)).

Comparison Example 2

Figure 9:
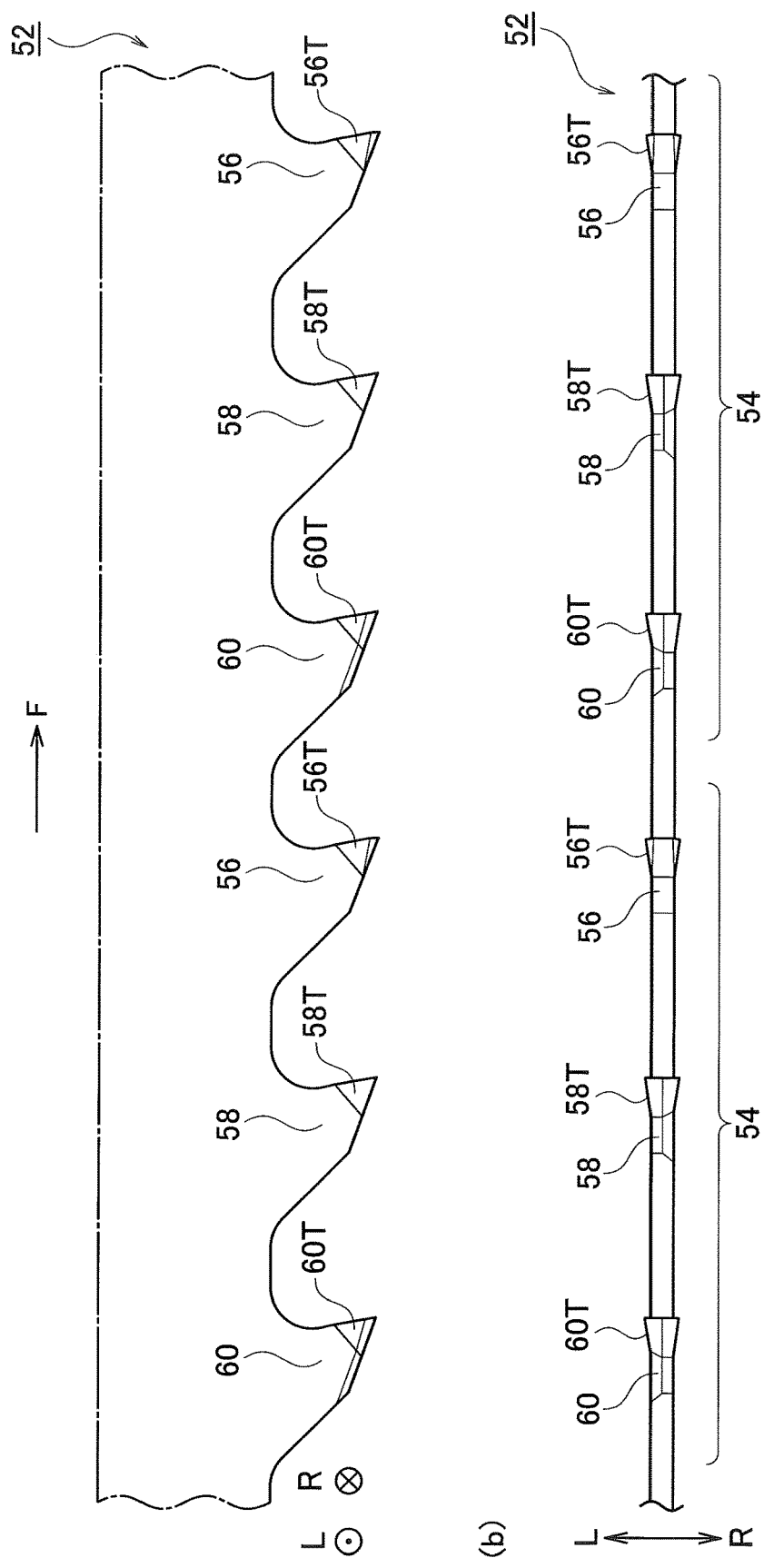
FIG. 9 is a diagram showing a hard tip band-saw blade according to a comparison example 2, in which (a) shows a left side face of a part of the hard tip band-saw blade and (b) shows the part of the hard tip band-saw blade seen from a cutting edge side (tooth top side).
Figure 10:
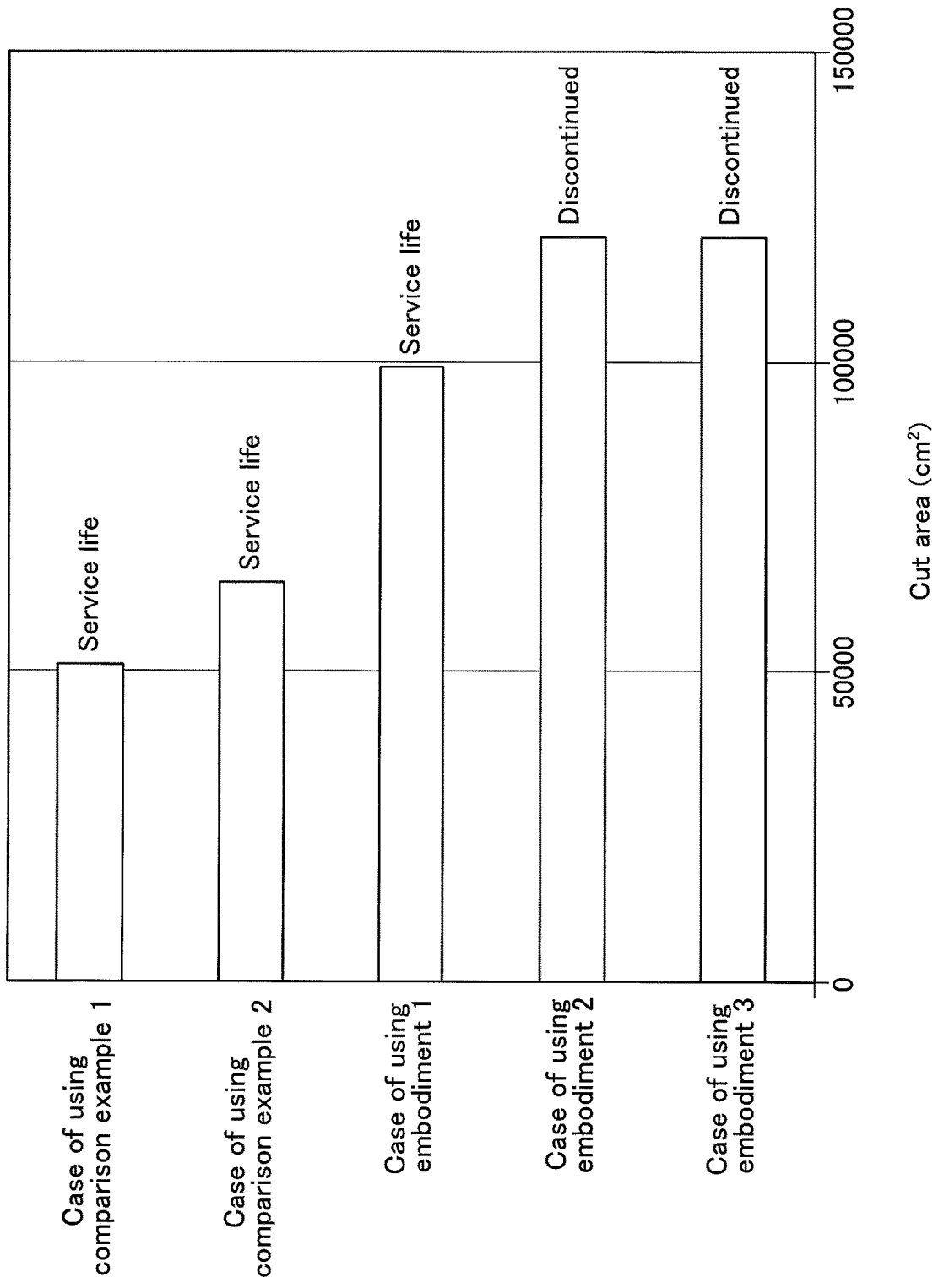
FIG. 10 is a graph showing workpiece cut areas (cumulative cut areas) as a result of cutting test carried out on embodiment products 1 to 3 and comparison products 1 and 2.

As shown in FIG. 9(a)(b), a hard tip band-saw blade 52 of the comparison example 2 is a cutting tool corresponding to the second prior-art hard tip band-saw blade and has alternating sawtooth groups 54 each being a combination of a plurality of sawteeth. Hereunder, the structure of the hard tip band-saw blade 52 will briefly be explained.

Each of the sawtooth groups 54 includes, as the plurality of sawteeth, a leading tooth 56, a first following tooth 58, and a second following tooth 60. In other words, each sawtooth group 54 is formed with three sawteeth. Here, the leading tooth 56 has, on its tooth top side, a hard tip 56T made of cemented carbide and is configured like the second leading tooth 22 in the second sawtooth subgroup 16 of the hard tip band-saw blade 10 (refer to FIG. 1(a)(b)). The first following tooth 58 has, on its tooth top side, a hard tip 58T made of cemented carbide and is configured like the second following tooth 24 in the second sawtooth subgroup 16 of the hard tip band-saw blade 10 (refer to FIG. 1(a)(b)).

The second following tooth 60 has, on its tooth top side, a hard tip 60T made of cemented carbide and is configured like the third following tooth 26 in the second sawtooth subgroup 16 of the hard tip band-saw blade 10 (refer to FIG. 1(a)(b)).

Embodiment Products 1 to 3 and Comparison Products 1 and 2

The hard tip band-saw blade 10 according to the first embodiment is experimentally made as the embodiment product 1, the hard tip band-saw blade 28 according to the second embodiment as the embodiment product 2, and the hard tip band-saw blade 40 according to the third embodiment as the embodiment product 3. The hard tip band-saw blade 44 according to the comparison example 1 is experimentally made as the comparison product 1 and the hard tip band-saw blade 52 according to the comparison example 2 as the comparison product 2. The embodiment products 1 to 3 and comparison products 1 and 2 each are made to have a base-tooth-shape rake angle of 10 degrees, abase-tooth-shape clearance angle of 20 degrees, a band width of 41 mm, a band thickness of 1.3 mm, a band length of 4715 mm, and a pitch of 1.8/2 P. The cemented carbide tip of each of the embodiment products 1 to 3 and comparison products 1 and 2 is made of cemented carbide corresponding to K20.

Cutting Test

With the use of the embodiment products 1 to 3 and comparison products 1 and 2 and under a predetermined first cutting condition (a saw speed of 63 m/min and a one-cut cutting time of 5 min and 21 sec), a cutting test is carried out on a workpiece made of alloy tool steel (SKD61) having a diameter of 250 mm.

As a result of the cutting test, cut areas (cumulative cut areas) of the workpiece using the embodiment products 1 to 3 and comparison products 1 and 2 are summarized in FIG.

Figure 11:
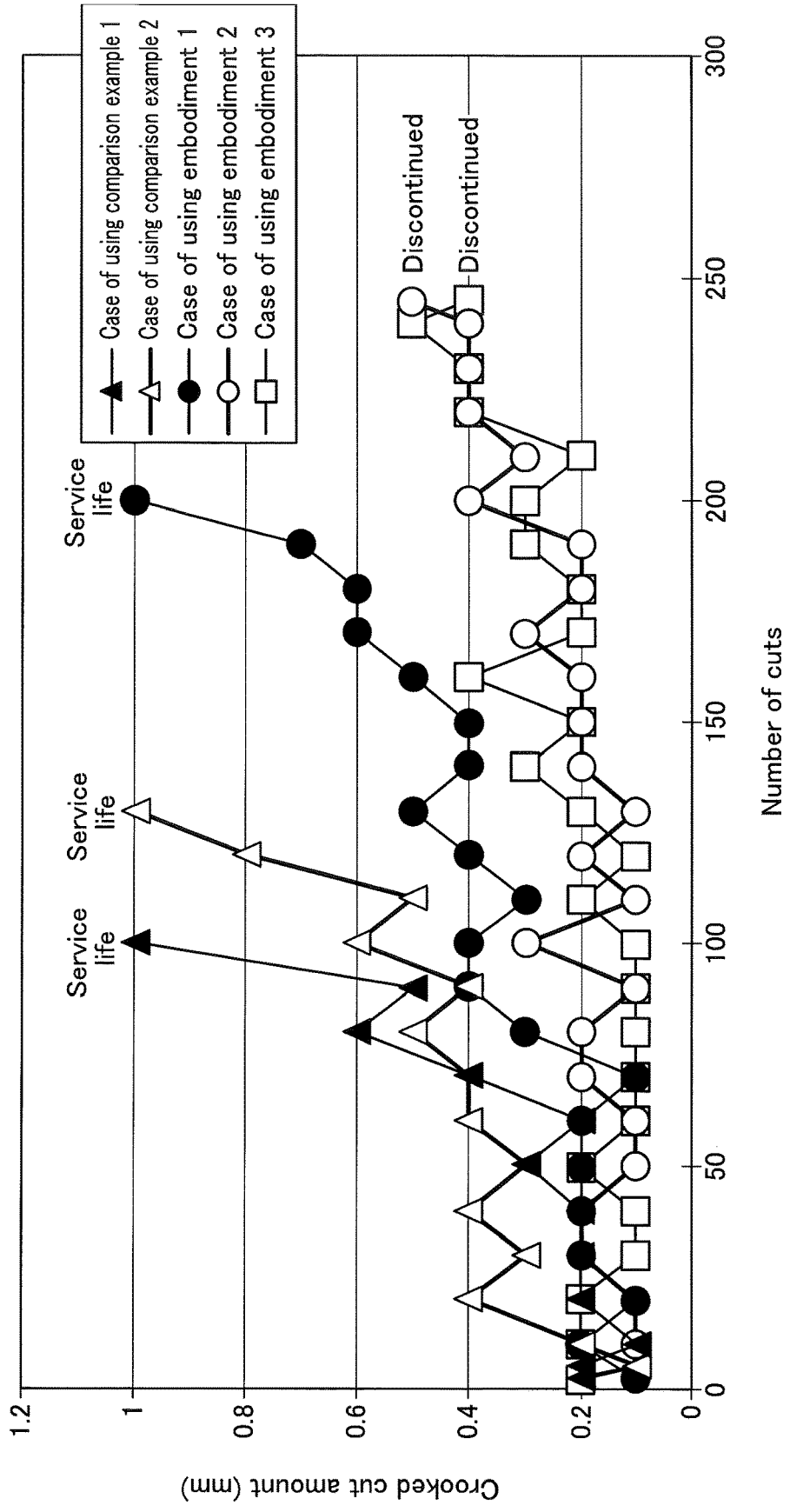
FIG. 11 is a graph showing a relationship between the number of cuts and a crooked cut amount of workpiece as a result of cutting test carried out on the embodiment products 1 to 3 and comparison products 1 and 2.

10. Also, as a result of the cutting test, relationships between the number of cuts and a crooked cut amount by the embodiment products 1 to 3 and comparison products 1 and 2 are summarized in FIG. 11.

Namely, in the case of using the comparison products 1 and 2, crooked cuts in the workpiece increase when the cut area exceeds 50000 cm2 and the hard tip band-saw blades reach their service lives. On the other hand, in the case of using the embodiment product 1, it is confirmed that crooked cuts in the workpiece are sufficiently suppressed until the cut area reaches around 100000 cm2 and a stable cutting ability is demonstrated. In the case of using the embodiment products 2 and 3, it is confirmed that crooked cuts in the workpiece do not increase even when the cut area exceeds 100000 cm2 and crooked cuts in the workpiece are more sufficiently suppressed than the case of using the embodiment product 1. In the cutting test, it is considered that the hard tip band-saw blade has reached its service life if the crooked cut amount in the workpiece becomes 1.0 mm or greater.

An observation result of cut faces of the workpiece during the cutting test is as mentioned below.

Namely, in the case of using the comparison products 1 and 2, at the time when the cut area reaches to 40000 cm2, it is confirmed that a surface roughness (arithmetic mean roughness) Ra of a cut face of the workpiece is 12 μm to 14 μm. In the case of using the comparison products 1 and 2, it is confirmed that the surface roughness Ra of a cut face of the workpiece at the time of service life of the hard tip band-saw blade is about 15 μm. On the other hand, in the case of using the embodiment produces 1 to 3, it is confirmed that the surface roughness Ra of a cut face of the workpiece at the time when the cut area reaches to 40000 cm2 is 8 μm to 9 μm. In the case of using the embodiment product 1, it is confirmed that the surface roughness Ra of a cut face of the workpiece at the time of service life of the hard tip band-saw blade is 10 μm or lower. In the case of using the embodiment products 2 and 3, it is confirmed that the surface roughness Ra of a cut face of the workpiece at the time when the cut area reaches to 100000 cm2 is 8 μm to 9 μm.

From the above-mentioned cutting test result, it is clarified that the case of using the embodiment product 1, compared to the case of using the comparison products 1 and 2, improves straight movement of the hard tip band-saw blade, sufficiently suppresses crooked cuts in a workpiece, and increases a cut face accuracy of the workpiece. It is also clarified that the case of using the embodiment products 2 and 3, compared to the case of using the comparison products 1 and 2, further improves straight movement of the hard tip band-saw blade, further suppresses crooked cuts in a workpiece, and further increases a cut face accuracy of the workpiece.

Namely, the inventors of this application obtain a first knowledge that forming a sawtooth group with a first sawtooth subgroup corresponding to the sawtooth group of the first prior-art hard band-saw blade and a second sawtooth subgroup corresponding to the sawtooth group of the second prior-art hard band-saw blade is able to sufficiently suppress a crooked cut in a workpiece made of hard metal such as steel, and at the same time, improve a cut face accuracy of the workpiece. Also the inventors of this application obtain a second knowledge that arranging, as a middle tooth, a left-right symmetrical sawtooth between a first leading tooth and a first following tooth in the first sawtooth subgroup, as well as between a second leading tooth and a second following tooth in the second sawtooth subgroup more sufficiently suppresses a crooked cut in a workpiece made of hard metal, and at the same time, more improves a cut face accuracy of the workpiece.

INDUSTRIAL APPLICABILITY

According to the present invention, straight movement of the hard tip band-saw blade can be maintained even if the first following tooth, which is a left-right symmetrical plectrum tooth, involves accuracy variations due to manufacturing errors. As a result, according to the present invention, a crooked cut or the like in a workpiece can sufficiently be suppressed to improve a cut face accuracy of the workpiece and the service life of the hard tip band-saw blade.

The invention claimed is:

1. A hard tip band-saw blade used when carrying out a cutting process on a workpiece including alternating sawtooth groups each being a combination of a plurality of sawteeth with each sawtooth being provided with a hard tip of hard material on a tooth top side of the sawtooth, wherein
each sawtooth group is formed from a first sawtooth subgroup and a second sawtooth subgroup,
the first sawtooth subgroup has a plurality of sawteeth that include a first leading tooth in which the hard tip is formed in a left-right symmetrical shape and having a chamfer at a tooth top corner part on each of left and right sides of the hard tip and
a first following tooth arranged to immediately follow the first leading tooth, set to be smaller than the first leading tooth in tooth height size, and the hard tip is formed in a left-right symmetrical shape that widens in a dove tail shape toward a tooth top edge side, the second sawtooth subgroup has a plurality of sawteeth that include
a second leading tooth set to be the same as the first leading tooth in tooth height size, formed in a left-right symmetrical shape, and having a chamfer at a tooth top corner part on each of left and right sides of the hard tip,
a second following tooth arranged to immediately follow the second leading tooth, set to be the same as the first following tooth in tooth height size, formed to widen in a dove tail shape toward a tooth top edge side, and having a chamfer at a tooth top corner part on a left/right first side of the hard tip, and
a third following tooth arranged to immediately follow the second following tooth, set to be the same as the first following tooth in tooth height size, formed to widen in a dove tail shape toward a tooth top edge side, and having a corner chamfer at a tooth top corner part on a left/right second side of the hard tip,
wherein the first following tooth, the second following tooth, and the third following tooth are configured to finish a cut face of the workpiece, and
each tooth top corner part of the hard tip of the first following tooth, the tooth top corner part on the left/right second side of the hard tip of the second following tooth, and the tooth top corner part on the left/right first side of the hard tip of the third following tooth most outwardly protrude in a left-right direction.

2. The hard tip band-saw blade according to claim 1, wherein the first sawtooth subgroup includes a first middle tooth arranged in the middle between the first leading tooth and the first following tooth, set to be smaller than the first leading tooth and larger than the first following tooth in tooth height size, formed in a left-right symmetrical shape, and having a chamfer at a tooth top corner part on each of left and right sides of the hard tip and the second sawtooth subgroup includes a second middle tooth arranged in the middle between the second leading tooth and the second following tooth, set to be the same as the first middle tooth in tooth height size, formed in a left-right symmetrical shape, and having a chamfer at a tooth top corner part on each of left and right sides of the hard tip.

3. The hard tip band-saw blade according to claim 1, wherein each tooth top corner part of the hard tip of the first following tooth is a protruding part that outwardly protrudes in the left-right direction with respect to the chamfer of the hard tip of the first leading tooth, a tooth top corner part on the left-right side of the hard tip of the second following tooth is a protruding part that outwardly protrudes in the left-right direction with respect to the chamfer of the hard tip of the second leading tooth, and a tooth top corner part on the left-right side of the hard tip of the third following tooth is a protruding part that outwardly protrudes in the left-right direction with respect to the chamfer of the hard tip of the second leading tooth.

4. The hard tip band-saw blade according to claim 1, wherein with the cut groove to be formed in the workpiece being divided into a plurality of sections in the groove width direction, each of the sawtooth groups includes the same number of and a plurality of sawteeth to cut the respective groove width sections of the cut groove of the workpiece.

5. The hard tip band-saw blade according to claim 1, wherein the first sawtooth subgroup and the second sawtooth subgroup in each of the sawtooth groups are one number of sawtooth subgroup.

6. The hard tip band-saw blade according to claim 1, wherein the first sawtooth subgroup in each of the sawtooth groups is two number of sawtooth subgroups and the second sawtooth subgroup in each of the sawtooth groups is one number of sawtooth subgroup.

7. The hard tip band-saw blade according to claim 2, wherein each tooth top corner part of the hard tip of the first following tooth is a protruding part that outwardly protrudes in the left-right direction with respect to the chamfer of the hard tip of the first leading tooth, a tooth top corner part on the left-right side of the hard tip of the second following tooth is a protruding part that outwardly protrudes in the left-right direction with respect to the chamfer of the hard tip of the second leading tooth, and a tooth top corner part on the left-right side of the hard tip of the third following tooth is a protruding part that outwardly protrudes in the left-right direction with respect to the chamfer of the hard tip of the second leading tooth.

8. The hard tip band-saw blade according to claim 2, wherein with the cut groove to be formed in the workpiece being divided into a plurality of sections in the groove width direction, each of the sawtooth groups includes the same number of and a plurality of sawteeth to cut the respective groove width sections of the cut groove of the workpiece.

9. The hard tip band-saw blade according to claim 2, wherein the first sawtooth subgroup and the second sawtooth subgroup in each of the sawtooth groups are one number of sawtooth subgroup.

10. The hard tip band-saw blade according to claim 2, wherein the first sawtooth subgroup in each of the sawtooth groups is two number of sawtooth subgroups and the second sawtooth subgroup in each of the sawtooth groups is one number of sawtooth subgroup.

* * * * *